United States Patent
Kosaka

(10) Patent No.: US 7,101,953 B2
(45) Date of Patent: Sep. 5, 2006

(54) PROCESS FOR PRODUCING PLASTIC LENS AND PLASTIC LENS

(75) Inventor: Masahisa Kosaka, Tokyo (JP)

(73) Assignee: HOYA Corporation, Tokyo (JP)

( * ) Notice: Subject to any disclaimer, the term of this patent is extended or adjusted under 35 U.S.C. 154(b) by 378 days.

(21) Appl. No.: 10/390,688

(22) Filed: Mar. 19, 2003

(65) Prior Publication Data

US 2003/0194487 A1    Oct. 16, 2003

(30) Foreign Application Priority Data

Mar. 28, 2002    (JP) .............................. 2002-090423

(51) Int. Cl.
*C08G 18/58*    (2006.01)
(52) U.S. Cl. .................. 528/73; 524/420; 524/742; 525/535; 351/159; 428/423.1; 427/162
(58) Field of Classification Search ............... 524/420, 524/742; 528/73; 525/535; 351/159; 428/423.1; 427/162
See application file for complete search history.

(56) References Cited

U.S. PATENT DOCUMENTS

2003/0225202 A1    12/2003    Kosaka

2004/0122201 A1 *  6/2004    Yoshimura et al. ........... 528/44

FOREIGN PATENT DOCUMENTS

| EP | 1 046 931 A1 | 10/2000 |
|---|---|---|
| EP | 1 046 931 A2 | 10/2000 |
| EP | 1 099 721 A1 | 5/2001 |
| EP | 1 134 242 A2 | 9/2001 |
| JP | 2001-002783 | 1/2001 |
| JP | 2001-002933 | 1/2001 |
| JP | 2001-330701 | 11/2001 |
| JP | 2002122701 | * 4/2002 |

OTHER PUBLICATIONS

International Search Report dated Jul. 23, 2003.
International Search Report dated Jul. 23, 2003.

* cited by examiner

*Primary Examiner*—Rachel Gorr
(74) *Attorney, Agent, or Firm*—Finnegan, Henderson, Farabow, Garrett & Dunner, LLP

(57) ABSTRACT

A process for producing plastic lenses, having higher refractive index and Abbe's number without remarkably deteriorating basic physical properties such as mechanical strength, impact resistance and transparency, and plastic lenses. The process comprises mixing 1) a prepolymer with 2) a mixture comprising sulfur in an epithio group-containing compound and 3) a catalyst.

20 Claims, No Drawings

PROCESS FOR PRODUCING PLASTIC LENS AND PLASTIC LENS

CROSS-REFERENCE TO RELATED APPLICATIONS

The present application claims priority under 35 U.S.C. § 119 of Japanese Application No. 2002-090423, filed Mar. 28, 2002, the disclosure of which is expressly incorporated by reference herein.

DESCRIPTION

1. Field of the Invention

A novel process is described for producing plastic lenses for spectacles having a high refractive index, a high Abbe number and having excellent transparency, and to plastic lenses obtained by the process.

2. Background of the Invention

In the market of plastic lenses, plastic lenses having higher refractive index and Abbe number without remarkably deteriorating basic physical properties such as mechanical strength and impact resistance are desirable. As an example of such plastic lenses, JP-A-2001-330701 discloses a plastic lens made from an epithio group-containing compound, a polythiol compound, and a polyisocyanate compound. This lens has a refractive index of 1.70. However, plastic lenses having a higher refractive index than that of the plastic lens as disclosed in JP-A-2001-330701 are desirable.

Optical materials having a high refractive index and a high Abbe number are disclosed in EP-A-1 046 931. These optical materials are obtained from a composition which comprises a mixture of a compound comprising sulfur and an inorganic compound comprising at least one atom of sulfur and selenium. However, plastic lenses comprising sulfur often exhibit insufficient transparency.

There have been further proposals to prepare plastic lenses by adding elemental sulfur to lens monomers in JP-A-2001-2783 and JP-A-2001-2933. However, even when the technique of JP-A-2001-330701 as cited above is combined with those of JP-A-2001-2783 and JP-A-2001-2933, it was impossible to obtain a transparent plastic lens containing an epithio group-containing compound, a polythiol compound, a polyisocyanate compound, and sulfur.

SUMMARY OF THE INVENTION

The present inventors have discovered a process for producing a plastic lens, comprising mixing (1) a prepolymer with (2) a mixture comprising sulfur in an epithio group-containing compound and (3) a catalyst.

The present inventors have also discovered a process of producing a plastic lens, comprising a step of preparing three kinds of starting materials: (1) a prepolymer obtained by reacting a polyisocyanate compound and a polythiol compound in an epithio group-containing compound, (2) a mixed solution (mixture X) obtained by mixing an epithio group-containing compound and sulfur, and (3) a mixed solution (mixture Y) obtained by mixing at least one compound chosen from an epithio group-containing compound and a polythiol compound with a catalyst; and a step of mixing the three kinds of starting materials and polymerizing the mixture.

The present inventors have further discovered a plastic lens wherein the lens is formed by the process comprising mixing (1) a prepolymer with (2) a mixture comprising sulfur in an epithio group-containing compound and (3) a catalyst.

A non-limiting embodiment of the invention provides plastic lenses having higher refractive index and Abbe number without remarkably deteriorating basic physical properties.

DESCRIPTION OF THE INVENTION

The particulars shown herein are by way of example and for purposes of illustrative discussion of the various embodiments of the present invention only. In this regard, no attempt is made to show details of the invention in more detail than is necessary for a fundamental understanding of the invention, the description making apparent to those skilled in the art how the several forms of the invention may be embodied in practice.

Unless otherwise stated, a reference to a compound or component, includes the compound or component by itself, as well as in combination with other compounds or components, such as mixtures of compounds.

As an overview, the present disclosure relates to a plastic lens prepared from an epithio group-containing compound, a polythiol compound, a polyisocyanate compound, and sulfur, wherein the lens is obtained by previously preparing the above three kinds of starting materials, mixing the three kinds of starting materials, and polymerizing the mixture.

The prepolymer is one of the three kinds of starting materials and may be obtained by reacting a polyisocyanate compound and a polythiol compound in an epithio group-containing compound.

Non-limiting examples of the polyisocyanate compound include xylylene diisocyanate, 3,3'-dichlorodiphenyl-4,4'-diisocyanate, 4,4'-diphenylmethane diisocyanate, hexamethylene diisocyanate, 2,5-bis(isocyanatomethyl)-1,4-dithiane, bis(isocyanatomethyl) sulfide, bis(isocyanatoethyl) sulfide, bis(isocyanatomethyl) disulfide, bis(isocyanatoethyl) disulfide, 2,2',5,5'-tetrachlorodiphenyl4,4'-diisocyanate, and tolylene diisocyanate. Polyisocyanates having one or more alicyclic groups may optionally be used. Specific examples include bis(isocyanatomethyl)cyclohexane, bis(4-isocyanatocyclohexyl)methane, bis(4-isocyanatomethylcyclohexyl) methane, cyclohexane diisocyanate, isophorone diisocyanate, 2,5-bis(isocyanatomethyl)bicyclo[2,2,2]octane, 2,5-bis(isocyanatomethyl)bicyclo[2,2,1]heptane, 2-isocyanatomethyl-3-(3-isocyanatopropyl)-5-isocyanatomethyl-bicyclo[2,2,1]-heptane, 2-isocyanatomethyl-3-(3-isocyanatopropyl)-6-isocyanatomethyl-bicyclo[2,2,1]-heptane, 2-isocyanatomethyl-2-[3-isocyanatopropyl]-5-isocyanatomethyl-bicyclo[2,2,1]-heptane, 2-isocyanatomethyl-2-(3-isocyanatopropyl)-6-isocyanatomethyl-bicyclo[2,2,1]-heptane, 2-isocyanatomethyl-3-(3-isocyanatopropyl)-6-(2-isocyanatoethyl)-bicyclo[2,2,1]-heptane, 2-isocyanatomethyl-3-(3-isocyanatopropyl)-6-(2-isocyanatoethyl)-bicyclo[2,2,1]-heptane, 2-isocyanatomethyl-2-(3-isocyanatopropyl)-5-(2-isocyanatoethyl)-bicyclo[2,2,1]-heptane, and 2-isocyanatomethyl-2-(3-isocyanatopropyl)-6-(2-isocyanatoethyl)-bicyclo[2,2,1]-heptane.

Of these, mention may be made, for example, of bis(isocyanatomethyl)bicyclo[2,2,1]heptane, cyclohexane diisocyanate, and bis(isocyanatomethyl)-1,4-dithiane.

Non-limiting examples of the polythiol compound include compounds having sulfur other than that in a mercapto group, such as methanedithiol, ethanedithiol, propanedithiol, 1,6-hexanedithiol, 1,2,3-propanetrithiol, tetrakis(mercaptomethyl) methane, cyclohexanedithiol, 2,2-dimethylpropane-1,3-dithiol, 3,4-dimethoxybutane-1,2-dithiol, 2-methylcyclohexane-2,3-dithiol, bis(mercaptomethyl)cyclohexane, 2,3-dimercapto-1-propanol (2-mercaptoacetate), 2,3-dimercapto-1-propanol (3-mercaptoacetate), diethylene glycol bis(2-mercaptoacetate), diethylene glycol bis(3-mercaptopropionate), 1,2- dimercaptopropyl methyl ether, 2,3-dimercaptopropyl methyl ether, 2,2-bis(mercaptomethyl)-1,3-propanedithiol, bis(2-mercaptoethyl) ether, ethylene glycol bis(2-mercaptoacetate), ethylene glycol bis(3-mercaptopropionate), trimethyloylpropane tris(2-mercaptoacetate), trimethylolpropane tris(3-mercaptopropionate), pentaerythritol tetrakis(2-mercaptoacetate), pentaerythritol tetrakis(3-mercaptopropionate), 1,2-bis(2-mercaptoethylthio)-3-mercaptopropane, bis(mercaptomethyl) sulfide, bis(mercaptoethyl) sulfide, bis(mercaptopropyl) sulfide, bis(mercaptomethylthio)methane, bis(2-mercaptoethylthio)methane, bis(3-mercaptopropyl)methane, 1,2-bis(mercaptomethylthio)ethane, 1,2-(2-mercaptoethylthio)ethane, 1,2-(3-mercaptopropyl)ethane, 1,3-bis(mercaptomethylthio)propane, 1,3-bis(2-mercaptoethylthio)propane, 1,3-bis(3-mercaptopropylthio)propane, 1,2-bis(2-mercaptoethylthio)-3-mercaptopropane, 2-mercaptoethylthio-1,3-propanedithiol, 1,2,3-tris(mercaptomethylthio)propane, 1,2,3-tris(2-mercaptoethylthio)propane, 1,2,3-tris(3-mercaptopropylthio)propane, tetrakis(mercaptomethylthiomethyl)methane, tetrakis(2-mercaptoethylthiomethyl)methane, tetrakis(3-mercaptopropylthio methyl)methane, bis(mercaptomethyl) disulfide, bis(mercaptoethyl) disulfide, bis(mercaptomethyl)-3,6,9-trithia-1,11 -undecanedithiol, bis(1,3-dimercapto-2-propyl) sulfide, 3,4-thiophenedithiol, tetrahydrothiophene-2,5-dimercaptomethyl, 2,5-dimercapto-1,3,4-thiadiazole, 2,5-dimercapto-1,4-dithiane, 2,5-bis(mercaptomethyl)-1,4-dithiane, and 2,5-bis(mercaptoethyl)-1,4-dithiane.

Of these, mention may be made, for example, of bis(mercaptomethyl)-1,4-dithiane, bis(mercaptoethyl) sulfide, bis(mercaptoethyl) disulfide, and 1,2-bis(mercaptoethyl)thio-3-mercaptopropane.

The epithio group-containing compound is also called an episulfide-based monomer. Non-limiting examples of the monomer include episulfide compounds having an alicyclic skeleton, such as 1,3- and 1,4-bis(β-epithiopropylthio)cyclohexanes, 1,3- and 1,4-bis(β-epithiopropylthiomethyl)cyclohexanes, bis[4-(β-epithiopropylthio)cyclohexyl]methane, 2,2-bis[4-(β-epithiopropylthio)cyclohexyl]propane, and bis[4-(β-epithiopropylthio)cyclohexyl] sulfide; episulfide compounds having an aromatic skeleton, such as 1,3- and 1,4-bis(β-epithiopropylthio)benzenes, 1,3- and 1,4-bis(β-epithiopropylthiomethyl)benzenes, bis[4-(β-epithiopropylthio)phenyl]methane, 2,2-bis[4-(β-epithiopropylthio)phenyl]propane, bis[4-(β-epithiopropylthio)phenyl]sulfide, bis[4-(β-epithiopropylthio)phenyl]sulfine, and 4,4-bis(β-epithiopropylthio)biphenyl; episulfide compounds having a dithiane ring skeleton, such as 2,5-bis(β-epithiopropylthiomethyl)-1,4-dithiane, 2,5-bis(p-epithiopropylthioethylthiomethyl)-1,4-dithiane, 2,5-bis(β-epithiopropylthioethyl)-1, 4-dithiane, and 2,3,5-tri(β-epithiopropylthioethyl)-1,4-dithiane; and episulfide compounds having an aliphatic skeleton, such as 2-(2-β-epithiopropylthioethylthio)-1,3-bis(β-epithiopropylthio)propane, 1,2-bis[(2-β-epithiopropylthioethyl)thio]-3-(β-epithiopropylthio)propane, tetrakis(β-epithiopropylthiomethyl)methane, 1,1,1-tris(β-epithiopropylthiomethyl)propane, bis(β-epithiopropyl) sulfide, and bis(β-epithiopropyl) disulfide.

Further, many epithio group-containing compounds are conventionally known, and specific examples thereof are disclosed in, for example, JP-A-09-071580, JP-A-09-110979, JP-A-09-255781, JP-A-03-081320, JP-A-11-140070, JP-A-11-183702, JP-A-11-189592, JP-A-11-180977, and Japanese Domestic Re-Publication No. 01-810575. The episulfide-based monomers disclosed in these patents may also be employed.

Of these compounds, mention may be made, for example, of bis(β-epithiopropyl) sulfide and bis(β-epithiopropyl).

In addition, to promote the reaction between the polyisocyanate compound and the polythiol compound, a catalyst that may, for example, be utilized in the preparation of the prepolymer may be added to the liquid of the starting materials.

The catalyst may be, for example, a tin compound represented by the following general formula (I):

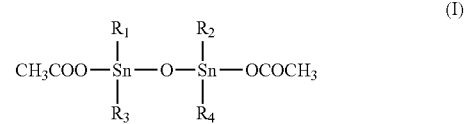

wherein R1, R2, R3, and R4, which may be identical or different, each represent a $C_1$–$C_4$ alkyl group.

Specific non-limiting examples of the catalyst represented by the general formula (I) include tetramethyl-diacetoxy-distannoxane, tetraethyl-diacetoxy-distannoxane, tetrapropyl-diacetoxy-distannoxane, and tetrabutyl-diacetoxy-distannoxane. An amount of the catalyst to be added may range, for example, from 0.0005% by weight to 0.1% by weight of the whole amount of the starting materials of the prepolymer.

In the prepolymer, with respect to the mixing ratio of the polyisocyanate compound and the polythiol compound, there may exist an excess of polythiol compound so as to have thiols at the end terminals of as many of the prepolymers as possible. The —SH/—NCO molar ratio may be, for example, greater than or equal to 1.75.

Further, the epithio group-containing compound may be used as a reactive diluent during the preparation of the prepolymer. Taking into account the viscosity at which the prepolymer can be handled and the amount of the epithio group-containing compound into which sulfur is dissolved (for mixture X), the amount of the epithio group-containing compound to be added during the preparation of the prepolymer may be, for example, at least 50% by weight of the whole amount of the starting materials of the prepolymer. In the case where the viscosity of the prepolymer is large, such as, for example, greater than 5,000 mPa.s, an epithio group-containing compound may be added in appropriate amounts in order to regulate the viscosity of the prepolymer so that mixing of the prepolymer with other components may be easily accomplished. When the epithio group-containing compound is used as the starting material of the prepolymer, it is considered that even when a polythiourethane is formed by the reaction of the polyisocyanate compound and the polythiol compound, the epithio group-containing compound dissolves the formed polythiourethane therein so that it becomes possible to control increase of viscosity.

Taking into consideration the mixing with other starting materials, the viscosity of the prepolymer may be, for example, less than or equal to 5,000 mPa.s at 25° C.

The temperature and reaction time for the preparation of the prepolymer are not limited. However, the reaction may be carried out, for example, from 10° C. to 80° C. for from 1 hour to 48 hours. Further, in order to keep the storage stability of the prepolymer after the preparation, the prepolymer may optionally be cooled to a temperature ranging from −5° C. to room temperature.

From the standpoints of obtaining good heat resistance and keeping a stable lens shape, the content of the whole of the polyisocyanate compound and the polythiol compounds is, for example, less than or equal to 15% by weight of the whole amount of the starting materials.

Next, the mixture X, the second starting material of the three kinds of starting materials, which is obtained by mixing an epithio group-containing compound and sulfur, will be described.

An object of mixing sulfur and the epithio group-containing compound is to efficiently dissolve sulfur. In the case where sulfur is added to the other starting materials (the polythiol compound and the polyisocyanate compound), gases are likely to be generated during the dissolution or the sulfur may not dissolve. As a result, the obtained lens is inferior in transparency. Hence, this method is not preferred. From the standpoints of raising refractive index and reliably obtaining transparency, the amount of sulfur to be added may be, for example, in the range of from 5% to 30% by weight of the whole amount of the starting materials.

Compounds identical to or different from the epithio group-containing compounds used during the preparation of the prepolymer may optionally be used as the epithio group-containing compound for mixture X.

To obtain the mixture X by mixing sulfur with and dissolving it in the epithio group-containing compound, the mixed liquid may, for example, be heated and dissolved at a temperature ranging from 40° C. to 70° C. and then stirred at a temperature ranging from 30° C. to 50° C. for from 1 hour to 24 hours in order to prevent deposition of sulfur. Further, during mixing of the three kinds of starting materials, the mixture may optionally be cooled to a temperature ranging from 10° C. to 25° C.

The mixture Y is the third starting material and will be described next. The mixture Y is obtained by mixing at least one compound chosen from epithio group-containing compounds and polythiol compounds with a catalyst.

The epithio group-containing compounds that are used during the preparation of the prepolymer and the mixture X may optionally be used as the epithio group-containing compound for mixture Y. In this case, the epithio group-containing compounds used for the prepolymer and for the mixture X and the epithio group containing compound used for mixture Y may be the identical or different.

Similarly, as with the epithio group-containing compound, the polythiol compounds used for the prepolymer can be used as the polythiol compound for mixture Y. In this case, the polythiol compounds used for the prepolymer and for the mixture X and the polythiol compound used for mixture Y may be identical or different.

The catalyst that is used during the preparation of the third starting material, mixture Y, is added with intent to react at least one compound chosen from epithio group-containing compounds and polythiols with the epithio group-containing compound. The catalyst in mixture Y is utilized for reaction with the entire mixture of starting materials. Examples of the catalyst may include amines, phosphines, quaternary ammonium salts, quaternary phosphonium salts, tertiary sulfonium salts, secondary iodonium salts, miral acids, Lewis acids, organic acids, silicates, and tetrafluoroborates.

Non-limiting examples of the catalyst include, for example, aminoethanol, 1-aminopropanol, 2-aminopropanol, aminobutanol, aminopentanol, aminohexanol, tetramethylphosphonium chloride, tetramethylphosphonium bromide, tetraethylphosphonium chloride, tetraethylphosphonium bromide, tetra-n-butylphosphonium chloride, tetra-n-butylphosphonium bromide, tetra-n-butylphosphonium iodide, tetra-n-hexylphosphonium bromide, and tetra-n-octylphosphonium bromide.

Further, with respect to the catalyst to be used in the third starting material, mixture Y, it is necessary that the catalyst to be used is selected and that its amount is regulated depending upon the monomers to be used. The amount may range, for example, from 0.001% by weight to 0.1% by weight of the amount of the whole of the starting materials.

The three kinds of starting materials are prepared and mixed. The mixing method is not limited. In mixing, the setting temperature, the time required for this may be, for example, those conditions which allow the respective components to be thoroughly mixed. Excessive temperature and time will likely cause an undesirable reaction among the respective starting materials and additives and increase the viscosity, thereby making the casting operation difficult. Hence, such conditions may not be appropriate.

From these viewpoints, the mixing temperature may range, for example, from −30° C. to 50° C, and further, for example, in the range from −5° C. to 30° C. The mixing time may range, for example, from 5 minutes to 2 hours, and further, for example, from 5 minutes to 15 minutes.

Further, from the standpoint of preventing the generation of bubbles during cast polymerization curing to be carried out later, a degassing operation may be carried out, for example, in vacuo before, during or after mixing the respective starting materials and additives. At this time, the degree of vacuum may range, for example, from 0.1 mmHg to 50 mmHg, and, further, for example, from 1 mmHg to 20 mmHg.

Moreover, from the standpoint of further enhancing the quality of the optical materials, purification of the mixtures of main and sub-starting materials or purification of the main and sub-starting materials before mixing may occur, for example, by filtration of impurities with a filter having a pore diameter ranging, for example, from 0.05 mm to 3 mm.

The mixed starting materials are poured, for example, into a glass or metallic mold and subjected to polymerization curing, such as in an electric furnace. The curing temperature may range, for example, from 5° C. to 120° C. and the curing time may range, for example, from 1 hour to 72 hours. Further, for eliminating distortion of the optical materials, after completion of the curing the materials may be subject to an annealing processing at a temperature ranging, for example, from 50° C. to 150° C. for, for example, from 10 minutes to 5 hours.

In the case where after the polymerization the plastic lens is hard to peel apart from the mold, using or adding at least one releasing agent chosen from known external and internal releasing agents may enhance the release properties. Further, for the purpose of protecting the resin or eyes from ultraviolet rays, UV absorbers may be used; and for the purpose of protecting eyes from infrared rays, IR absorbers may be used. Their amounts vary depending upon the absorptive ability and maximum absorption wavelength of additives to be used, but may range, for example, from 0.03% by weight to 3% by weight of the amount of the whole of the entire mixture. Optionally, these absorbers may be impregnated in the resin at a later point in time.

In addition, for the purpose of keeping or enhancing the appearance of the resin, an antioxidant may be added, or bluing with a small amount of a coloring matter may be employed.

The plastic lens obtained may optionally be subjected to a dyeing process with a dye. Also, in order to enhance the resistance to abrasion, a cured film may optionally be formed on the plastic lens using a coating liquid comprising at least one compound chosen from an organosilicon compound and an acrylic compound comprising fine particles of inorganic materials such as, for example, tin oxide, silicon oxide, zirconium oxide, and titanium oxide.

Further, in order to enhance the impact resistance, a primer layer composed mainly of polyurethane may optionally be formed on the plastic lens.

Moreover, in order to impart an antireflection performance, an antireflection film made of an inorganic material such as, for example, silicon oxide, titanium dioxide, zirconium oxide, and tantalum oxide may be formed on the cured film. In addition, in order to enhance the water repellence, a water repellent film made of, for example, a fluorine atom-containing organosilicon compound may be formed on the antireflection film.

The present disclosure further relates to a plastic lens obtainable by the above described process. Additionally, the present disclosure relates to a transparent plastic lens obtainable by reacting a polyisocyanate compound, a polythiol compound, an epithio group-containing compound and sulfur, wherein the lens has, for example, the same or essentially the same transparency as a plastic lens of the same thickness and being prepared from the same starting materials in the same amounts but without sulfur.

The transparency of the lens is defined by its transmission factor $T=\phi_{ex}/\phi_{in}$, wherein $\phi_{ex}$ is the radiation flux of a light beam emerging the lens and $\phi_{in}$ is the radiation flux of the light beam shining into the lens, the light beam being visible (i.e. having a wavelength in the range of 400 to 750 nm).

The value of transparency of the lens depends on the value of refractive index of the lens, when anti-reflective film is not coated, because the lens having high refractive index gives a value of high reflection.

The transparent lens having refractive index ranging from 1.55 to 1.65 has, for example, a transparency in the range from 0.80 to 0.92, further, for example, in the range from 0.85 to 0.92 and even further, for example, in the range from 0.88 to 0.92, when measured with a lens having a thickness of 1.8 mm at any wavelength in the range from 500 nm to 600 nm.

The transparent lens having refractive index ranging from 1.66 to 1.76 has, for example, a transparency in the range from 0.80 to 0.91, further, for example, in the range from 0.85 to 0.91 and even further, for example, in the range from 0.88 to 0.91, when measured with a lens having a thickness of 1.8 mm at any wavelength in the range of 500 nm to 600 nm.

The present invention will be further illustrated by way of the following Examples. These examples are non-limiting and do not restrict the scope of the invention.

EXAMPLES

The physical properties of the plastic lenses for spectacles obtained in the Examples and Comparative Examples were evaluated in the following manners.
(1) Refractive Index and Abbe's Number:
   Measured at 20° C. using a precision refractometer, Model KPR-200 manufactured by Kalnew Optical Industrial Co., Ltd.
(2) Transparency:
   Judgement by naked eye Example 1

(a) Preparation of Prepolymer (Component A):
In a three-necked flask were charged 14.40 parts by weight of bis(isocyanatomethyl)-1,4-dithiane, 33.20 parts by weight of bis(mercaptomethyl)-1,4-dithiane, 0.024 parts by weight of tetra-n-butyl-1,3-diacetoxy-distannoxane, and 47.60 parts by weight of bis(β-epithiopropyl) sulfide. The mixture was reacted under stirring in a nitrogen atmosphere for 24 hours while keeping at 50° C. Thereafter, the reaction mixture was cooled to a temperature in the vicinity of room temperature.

(b) Preparation of Mixture X (Component B):
In a three-necked flask were charged 14.29 parts by weight of powdered sulfur and 75.19 parts by weight of bis(β-epithiopropyl) sulfide, and the mixture was heated at 60° C. and dissolved in a nitrogen atmosphere, followed by reacting while stirring at 40° C. for about 12 hours. The reaction mixture was cooled to about 25° C. before further mixing with components A and C.

(c) Preparation of Mixture Y (Component C):
Tetrabutylphosphonium bromide (0.04 parts by weight) and bis(β-epithiopropyl) sulfide (2.00 parts by weight) were weighed and dissolved to prepare a solution.

(d) Mixing and Polymerization of Component A, Component B and Component C:
In a three-necked flask charged with 89.48 parts by weight of the component B, 9.52 parts by weight of the component A (the whole amount of 4-dithiane the urethane components, namely bis(isocyanatomethyl)-1,4-dithiane and bis(mercaptomethyl)-1, was 4.76 parts by weight) was added and mixed. To this mixed liquid, 1.02 parts by weight of the component C. was added and mixed, and the mixture was subjected to degassing. Thereafter, the mixture was poured into lens molds of 0.00 D and −3.00 D, while filtering through a 1.0-micron filter made of PTFE (polytetrafluoroethylene). Polymerization and curing were carried out by gradually elevating the temperature from 35° C. to 95° C. over 24 hours. After the curing, the cured products were cooled to a temperature in the vicinity of 70° C. and released from the molds, to obtain a 0.00 D lens and a −3.00 D lens. The evaluation results are shown in Table 1. The obtained lenses were transparent and had physical properties of a refractive index of 1.73 and an Abbe's number of 33.

Examples 2 to 9

The same procedures as in Example 1 were followed, except that the types and mixing ratio of the polyisocyanate compound and the polythiol compound and the amount of the epithio group-containing compound to be added were changed as shown in Table 1. The evaluation results are shown in Table 1. Similar to Example 1, there were obtained lenses that were transparent and had characteristics of a high refractive index and a high Abbe's number.

TABLE 1

| | | Example 1 | Example 2 | Example 3 | Example 4 | Example 5 | Example 6 | Example 7 | Example 8 | Example 9 |
|---|---|---|---|---|---|---|---|---|---|---|
| Prepolymer (component A) (parts by weight) | Polyisocyanate compound | BIMD: 1.44 | BIMD: 1.44 | BIMD: 1.44 | BIMD: 2.88 | DIMB: 1.33 | DIMB: 1.66 | BIMD: 1.67 | BIMD: 1.65 | BIMD: 1.44 |
| | Polythiol compound | BMMD: 3.32 | BMMD: 3.32 | BMMD: 3.32 | BMMD: 6.64 | BMMD: 3.43 | DMES: 3.10 | BMMD: 3.09 | DMTMP: 3.11 | BMMD: 3.32 |
| | SH/NCO | 2.5 | 2.5 | 2.5 | 2.5 | 2.5 | 2.5 | 2.0 | 2.5 | 2.5 |
| | Epithio group-containing compound | BEPS: 4.76 | BEPS: 4.76 | BEPS: 4.76 | BEPS: 9.52 | BEPS: 4.76 | BEPS: 4.76 | BEPS: 4.76 | BEPS: 4.76 | BEPS: 4.76 |
| | Catalyst: TK-1 | 0.0024 | 0.0024 | 0.0024 | 0.0024 | 0.0024 | 0.0024 | 0.0024 | 0.0024 | 0.0024 |

TABLE 1-continued

|  |  | Example 1 | Example 2 | Example 3 | Example 4 | Example 5 | Example 6 | Example 7 | Example 8 | Example 9 |
|---|---|---|---|---|---|---|---|---|---|---|
| Mixture X (component B) (parts by weight) | Epithio group-containing compound | BEPS: 75.19 | BEPS: 79.95 | BEPS: 72.81 | BEPS: 65.67 | BEPS: 75.19 | BEPS: 75.19 | BEPS: 75.19 | BEPS: 75.19 | BEPS: 34.72 BEPDS: 40.48 |
|  | Sulfur | 14.29 | 9.52 | 16.67 | 14.29 | 14.29 | 14.29 | 14.29 | 14.29 | 14.29 |
| Mixture Y (component C) (parts by weight) | Epithio group-containing compound | BEPS: 1 | BEPS: 1 | BEPS: 1 | BEPS: 1 | BEPS: 1 | BEPS: 1 | BEPS: 1 | BEPS: 1 | BEPS: 1 |
|  | Catalyst: TBPB | 0.02 | 0.02 | 0.02 | 0.02 | 0.02 | 0.02 | 0.02 | 0.02 | 0.02 |
| Composition ratio | Urethane component | 5 | 5 | 5 | 10 | 5 | 5 | 5 | 5 | 5 |
|  | Epithio component | 85 | 90 | 82.5 | 80 | 85 | 85 | 85 | 85 | 85 |
|  | Sulfur component | 15 | 10 | 17.5 | 15 | 15 | 15 | 15 | 15 | 15 |
| Appearance |  | Transparent | Transparent | Transparent | Transparent | Transparent | Transparent | Transparent | Transparent | Transparent |
| Optical characteristics | D (Refractive index) | 1.73 | 1.72 | 1.74 | 1.73 | 1.72 | 1.72 | 1.73 | 1.73 | 1.74 |
|  | $v_D$ (Abbe's number) | 33 | 34 | 33 | 33 | 34 | 34 | 33 | 33 | 32 |

Comparative Example 1

It was attempted to prepare lenses in the same composition ratio as in Example 1, without pre-making the urethane prepolymer (component A) prior to mixing.

(a) Preparation of Component D:

Bis(β-epithiopropyl) sulfide (80.95 parts by weight) and powdered sulfur (14.29 parts by weight) were mixed, and the mixture was heated and dissolved at 60° C. in a nitrogen atmosphere, followed by reacting under stirring at 40° C. for about 12 hours. The reaction mixture was cooled to about 25° C. before mixing with other components.

(b) Mixing and Polymerization of Starting Materials:

To the component D, 1.44 parts by weight of bis(isocyanatomethyl)-1,4-dithiane, 3.32 parts by weight of bis(mercaptomethyl)-1,4-dithiane, 0.0024 parts by weight of tetra-n-butyl-1,3-diacetoxy-distannoxane, and 0.02 parts by weight of tetrabutylphosphonium bromide were added and mixed, and the mixture was subjected to degassing. Thereafter, the mixture was poured into lens molds of 0.00 D and –3.00 D, while filtering through a 1.0-micron PTFE-made filter. Polymerization and curing were carried out by gradually elevating the temperature from 35° C. to 95° C. over 24 hours. After the curing, the cured products were cooled to a temperature in the vicinity of 70° C. and released from the molds. The obtained lenses were cloudy.

Comparative Example 2

It was attempted to prepare lenses by following the same procedures as in Comparative Example 1, except that the ratio of the urethane component was decreased.

The same procedures as in Comparative Example 1 were followed, except that the amounts of the urethane components bis(isocyanatomethyl)-1,4-dithiane and bis(mercaptomethyl)-1,4-dithiane were changed to 0.58 parts by weight and 1.33 parts by weight respectively and the amount of bis(β-epithiopropyl) sulfide was changed to 83.81 parts by weight. The obtained lenses were cloudy.

Comparative Example 3

It was attempted to prepare lenses with the same composition as in Example 2, except that sulfur was mixed and dissolved in the epithio group-containing compound containing the urethane prepolymer.

In a flask, 79.95 parts by weight of bis(β-epithiopropyl) sulfide, 1.44 parts by weight of bis (isocyanatomethyl)-1,4-dithiane, 3.32 parts by weight of bis(mercaptomethyl)-1,4-dithiane, and 0.0024 parts by weight of tetra-n-butyl-1,3-diacetoxy-distannoxane were weighed, and the mixture was stirred and reacted for 24 hours in a nitrogen atmosphere while keeping at 50° C. After the reaction, 9.52 parts by weight of powdered sulfur was added, and the mixture was heated at 60° C. in a nitrogen atmosphere. During the dissolution step, the solution became reddish and became a tar while generating heat and a yellow gas.

Comparative Example 4

It was attempted to prepare lenses in the same composition ratio as in Example 1, except that the reactive diluent (epitho compound) was not used during the preparation of the urethane prepolymer.

Bis(isocyanatomethyl)-1,4-dithiane (1.44 parts by weight), bis(mercptomethyl)-1,4-dithiane (3.32 parts by weight), and tetra-n-butyl-1,3-diacetoxy-distannoxane (0.0024 parts by weight) used as the catalyst were weighed, and the mixture was reacted for 24 hours in a nitrogen atmosphere while keeping at 50° C. The solution solidified, and even by adding bis(P-epithiopropyl) sulfide, mixing could not be done.

TABLE 2

|  | Comparative Example 1 | Comparative Example 2 | Comparative Example 3 | Comparative Example 4 |
|---|---|---|---|---|
| Polyisocyanate compound | BIMD: 1.44 | BIMD: 0.58 | BIMD: 1.44 | BIMD: 1.44 |
| Polythiol compound | BMMD: 3.32 | BMMD: 1.33 | BMMD: 3.32 | BMMD: 3.32 |
| SH/NCO | 2.5 | 2.5 | 2.5 | 2.5 |
| Epithio group-containing compound | — | — | BEPS: 79.95 | — |
| Catalyst: TK-1 | 0.0024 | 0.0024 | 0.0024 | 0.0024 |

TABLE 2-continued

|  |  | Comparative Example 1 | Comparative Example 2 | Comparative Example 3 | Comparative Example 4 |
|---|---|---|---|---|---|
| Catalyst: TBPB |  | 0.02 | 0.02 | 0.02 | 0.02 |
| Powdered sulfur |  | — | — | 9.52 | — |
| Component D (parts by weight) | Epithio group-containing compound | BEPS: 80.95 | BEPS: 83.81 | — | BEPS: 80.95 |
|  | Sulfur | 14.29 | 14.29 | — | 14.29 |
| Composition ratio | Urethane component | 5 | 2 | 5 | 5 |
|  | Epithio component | 85 | 88 | 90 | 85 |
|  | Sulfur component | 15 | 15 | 10 | 15 |
| Appearance |  | Cloudy | Cloudy | Sulfur runaway during reaction | Hardened while mixing |

BIMD: Bis(isocyanatomethyl)-1,4-dithiane
DIMB: Bis(isocyanatomethyl)bicyclo[2,2,1]heptane
BMMD: Bis(mercaptomethyl)-1,4-dithiane
DMES: Bis(mercaptoethyl) sulfide
DMTMP: 1,2-Bis(mercaptoethylthio)-3-mercaptopropane
REPS: Bis(β-epithiopropyl) sulfide
BEPDS: Bis(β-epithiopropyl) disulfide
TBPB: Tetrabutylphosphonium bromide
TK-1: Tetrabutyl-diacetoxy-distannoxane While the invention has been described in connection with certain embodiments so that aspects thereof may be more fully understood and appreciated, it is not intended to limit the invention to these particular embodiments. On the contrary, it is intended to cover all alternatives, modifications and equivalents as may be included within the scope of the invention as defined by the appended claims.

What is claimed is:

1. A process for producing a plastic lens, comprising mixing (1) a prepolymer obtainable by reacting a polyisocyanate compound and a polythiol compound in an epithio group-containing compound with (2) a mixture comprising sulfur in an epithio group-containing compound and (3) a mixture of a catalyst with at least one compound chosen from an epithio group-containing compound and a polythiol compound.

2. The process for producing a plastic lens according to claim 1, wherein the ratio of the polythiol compound to the polyisocyanate compound in the prepolymer is greater than or equal to 1.75 in terms of —SH/—NCO molar ratio.

3. The process for producing a plastic lens according to claim 1, wherein a weight of the epithio group-containing compound in the prepolymer is greater than or equal to 50% by weight of the whole amount of the starting materials of the prepolymer.

4. The process for producing a plastic lens according to claim 1, wherein the content of sulfur ranges from 5% to 30% by weight of the whole amount of (1), (2), and (3).

5. The process for producing a plastic lens according to claim 1, wherein the whole of the polyisocyanate compound used for (1) is less than or equal to 15% by weight of the whole amount of (1), (2), and (3).

6. The process for producing a plastic lens according to claim 1, wherein the whole of the polythiol compound used for (1) and (3) is less than or equal to 15% by weight of the whole amount of (1), (2), and (3).

7. The process for producing a plastic lens according to claim 1, wherein the viscosity of the prepolymer is less than or equal to 5,000 mPa·s (25° C.).

8. The process for producing a plastic lens according to claim 1, wherein the polyisocyanate compound is at least one group chosen from bis(isocyanatomethyl)bicyclo[2,2,1]heptane, cyclohexane diisocyanate, and bis(isocyanatomethyl)-1,4-dithiane.

9. The process for producing a plastic lens according to claim 1, wherein the polythiol compound is at least one compound chosen from bis(mercaptomethyl)-1,4-dithiane, bis(mercaptoethyl) sulfide, bis(mercaptoethyl) disulfide, and 1,2-bis(mercaptoethyl)thio-3-mercaptopropane.

10. The process for producing a plastic lens according to claim 1, wherein the epithio group-containing compound is at least one compound chosen from bis(β-epithiopropyl) sulfide and bis(β-epithiopropyl) disulfide.

11. The process for producing a plastic lens according to claim 1, wherein a catalyst is added to a liquid for preparing the prepolymer.

12. The process for producing a plastic lens according to claim 11, wherein the catalyst is represented by the following general formula (I):

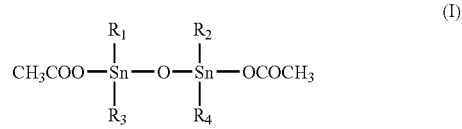

$$CH_3COO-\underset{R_3}{\underset{|}{\overset{R_1}{\overset{|}{Sn}}}}-O-\underset{R_4}{\underset{|}{\overset{R_2}{\overset{|}{Sn}}}}-OCOCH_3 \quad (I)$$

wherein R1, R2, R3, and R4, which may be identical or different, each represent a $C_1$–$C_4$ alkyl group.

13. The process for producing a plastic lens according to claim 12, wherein the catalyst represented by the general formula (I) is at least one compound chosen from tetramethyl-diacetoxy-distannoxane, tetraethyl-diacetoxy-distannoxane, tetrapropyl-diacetoxy-distannoxane, and tetrabutyl-diacetoxy-distannoxane.

14. The process for producing a plastic lens according to claim 1, further comprising a step of forming a cured film on the plastic lens.

15. The process for producing a plastic lens according to claim 14, wherein the cured film is prepared from an organosilicon compound starting material.

16. The process for producing a plastic lens according to claim 14, further comprising a step of forming an antireflection film on the cured film.

17. The process for producing a plastic lens according to claim 16, wherein the antireflection film is made of an inorganic substance.

18. The process for producing a plastic lens according to claim 16, further comprising a step of forming a water repellent film on the antireflection film.

19. The process for producing a plastic lens according to claim 18, wherein the water repellent film comprises a fluorine atom-containing organosilicon compound.

20. A plastic lens formed by the process comprising mixing (1) a prepolymer obtainable by reacting a polyisocyanate compound and a polythiol compound in an epithio group-containing compound with (2) a mixture comprising sulfur in an epithio group-containing compound and (3) a mixture of a catalyst with at least one compound chosen from an epithio group-containing compound and a polythiol compound.

\* \* \* \* \*